Feb. 20, 1968  E. W. FARMER  3,369,393
MULTIPLE ELEMENT FABRICATED TEST FIXTURE
Filed Nov. 27, 1964  3 Sheets-Sheet 1

INVENTOR.
EVERETT WALTER FARMER
BY
ATTORNEY

Feb. 20, 1968 E. W. FARMER 3,369,393
MULTIPLE ELEMENT FABRICATED TEST FIXTURE
Filed Nov. 27, 1964 3 Sheets-Sheet 3
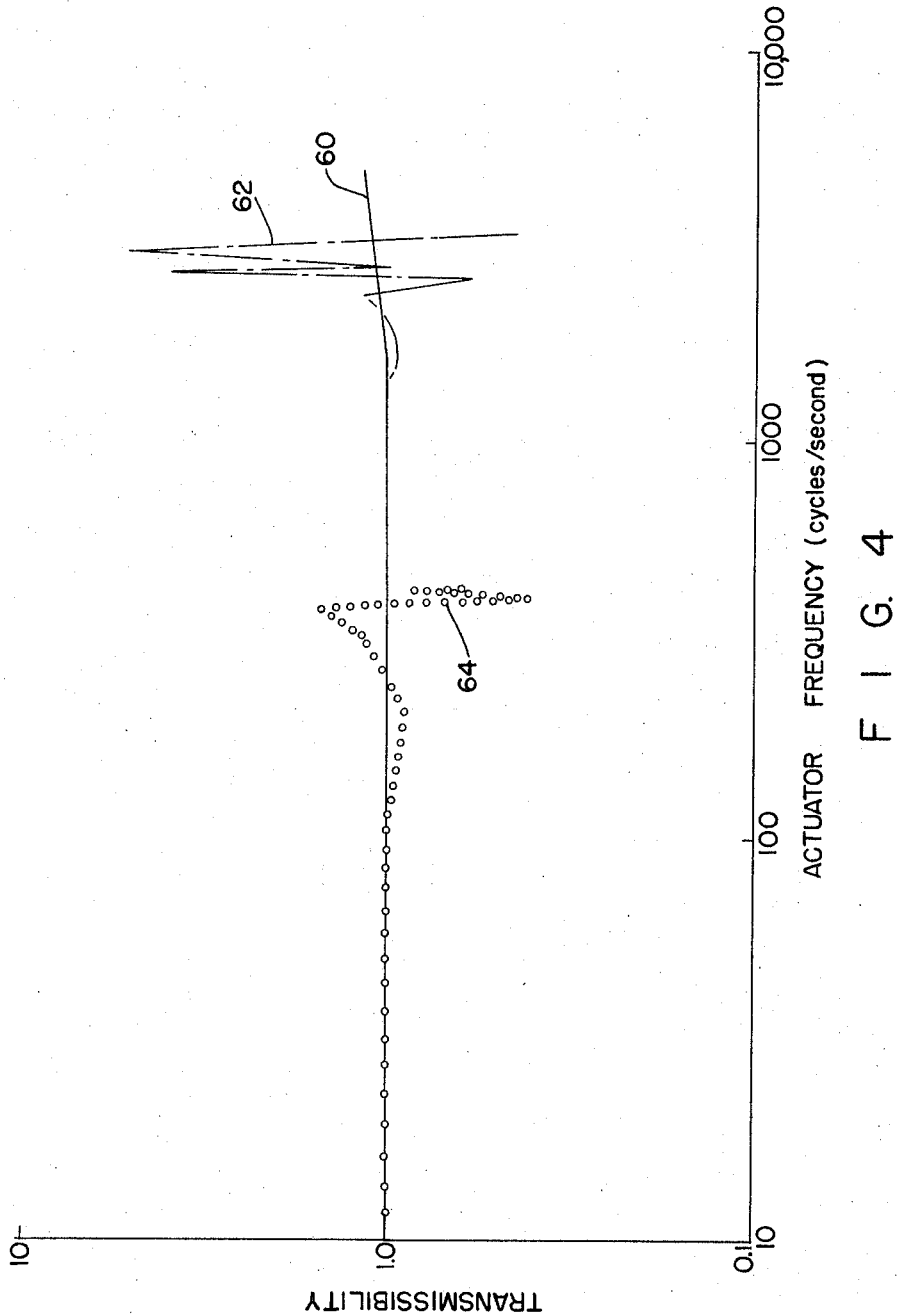
INVENTOR.
EVERETT WALTER FARMER
BY
ATTORNEY United States Patent Office 3,369,393
Patented Feb. 20, 1968

3,369,393
MULTIPLE ELEMENT FABRICATED
TEST FIXTURE
Everett W. Farmer, Reeds Ferry, N.H., assignor to
Sanders Associates Inc., Nashua, N.H., a corporation of Delaware
Filed Nov. 27, 1964, Ser. No. 414,163
19 Claims. (Cl. 73—71.6)

ABSTRACT OF THE DISCLOSURE

Apparatus is herein disclosed for a mechanical test fixture of the kind used to subject a component attached thereto to mechanical stresses as produced by vibration, shock and acceleration. The disclosure includes a lightweight multiple-element fabricated test fixture having an essentially invariant, unity mechanical transmissibility over a broad spectrum, even when the fixture is loaded with a component under test. The test fixture comprises a plurality of hollow cells having side walls which are formed by sheet members. Top and bottom plates are secured to the sheet members and form the end walls of these cells. The side and end walls of the cells are continuously secured to each other along their respective intersecting edges.

---

A test fixture of the kind with which the invention is concerned is the element in a mechanical environmental test machine that couples the component under test to the mechanical actuator producing the forces to which the component is to be subjected. The test fixture ideally has a mechanical transfer function, termed the transmissibility, that remains constant over the range of frequencies at which the component is to be tested. Thus, the ideal fixture transfers to the component a constant proportion of the forces developed by the actuator. Generally, the test fixture has a nominal transmissibility of 1.0 so that it transfers to the component the exact same forces that it receives from the actuator.

In order for a test fixture to transfer forces to a component without amplification, attenuation or other spurious variation, the test fixture should be free of mechanical resonances over the test spectrum. Also, it should be rigid so that it does not deform or flex under the influence of the actuator forces.

According to the prior art, castings, weldments and bolted structures are employed as mechanical environmental test fixtures. These structures, particularly the castings, are relatively heavy. The heavy load they present to the actuator increases the mechanical requirements imposed on the actuator structure, resulting in an increase in its cost and size.

Welded and bolted test fixtures have the further disadvantage that they tend to have resonances at relatively low frequencies within the range at which many present-day components are required to operate. These resonances are often due to the resonance of an individual member within the fixture. Moreover, many welded and bolted fixtures have substantial amplification factors at their resonant frequencies.

A more recent development employs viscoelastically-damped laminated structures as test fixtures. The resonances of individual members in these laminated test fixtures are generally not eliminated. The technique merely involves providing sufficient damping to decrease the resonance amplification factor. A further disadvantage of such laminated test fixtures is that they are costly to construct, particularly for testing large components.

Accordingly, it is an object of the present invention to provide an improved mechanical environmental test fixture having relatively uniform transmissibility over a relatively broad spectrum. It is a particular object to provide such a test fixture having substantially unity transmissibility.

Another object is to provide a test fixture of the above character that is relatively light weight.

A further object of the invention is to provide a multiple-element fabricated test fixture having a fundamental resonant frequency at a relatively high frequency and being free of individual member resonances at lower frequencies.

It is also an object of the invention to provide a test fixture of the above character that can be fabricated at relatively low cost.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 4 is a graph of test fixture transmissibility as a function of actuator frequency for two test fixtures made according to the present invention.

A test fixture embodying the invention is fabricated of thin plates, appropriately of aluminum, brazed together into an ordered array of cells. Each plate has all its edges fixed by an effectively continuous brazed connection to other plates extending from it.

The sizes of the cells may progressively change with position within the test fixture. This is done to distribute the different stresses on the fixture in a substantially uniform manner among the individual cells. Thus, in portions where relatively high stresses develop, the cells are made smaller than in regions where lesser stresses develop. By thus designing the sizes of the cells within the fixture according to the maximum stresses that develop therein, the added weight of unnecessarily small cells is avoided. Also, the possibility of unduly high stresses in a cell wall, which would tend to shorten the usable life of the fixture, can be forestalled.

It has been found that the thin plate braze-joined structure can readily be made to have an extremely high fundamental resonant frequency. Also, there are no lower frequency resonances of individual plates, because all the edges of each plate are fixed to other transversely extending members. Moreover, the thin plate test fixture has a large strength-to-weight ratio.

The use of brazing to join the plates together is particularly advantageous because it enables the cells to have relatively small size. This is often desired to facilitate distribution of high dynamic stresses to a plurality of cells. Also the small cell size helps to avoid low frequency resonance. By comparison, other metal joining techniques such as welding require relatively large clearances for the joining equipment.

Further, the brazed connections are continuous. This precludes resonances of the type that would develop along the free span between adjacent discrete connections.

There is normally a slight decrease in total strength of a brazed joint as compared with a welded joint; however, if high resonant frequencies are to be achieved, the fixture will have to be designed for low deflection and stress levels. In fact, the stresses that develop in a thin plate test fixture according to the invention are sufficiently small that the fixture has long fatigue life. By way of example, a test fixture incorporating the thin plate principle exhibited no deterioration of dynamic properties after 500 hours of use.

Although conventional dip brazing is preferred, oven brazing can also be used to join the members of the fixture into an integral unit.

Figure 1:
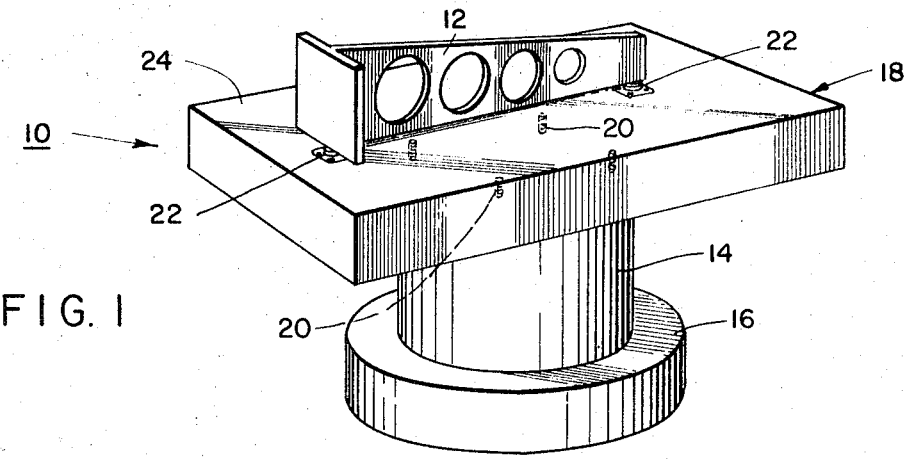
FIG. 1 is a pictorial view, partly broken away, of a mechanical environmental test machine.

More specifically, FIG. 1 shows a mechanical environmental test machine 10 for subjecting a component 12 to varying conditions of vibration, shock and acceleration. The machine 10 includes an actuator 14 of conventional design secured to a massive, relatively immobile base 16.

The actuator 14 develops forces whose amplitudes can be varied over a wide range of frequencies extending to thousands of cycles per second. These output forces are applied to a test fixture, indicated generally at 18, on which the component 12 is mounted. Specifically, the illustrated actuator applies the output forces developed therein to four or more upstanding threaded studs 20, four of which are illustrated, to which the fixture 18 is bolted.

The test fixture 18 has component-receiving fittings 22 secured to the upper surface of its top plate 24. The fittings 22 are mechanically secured to the top plate, e.g. by welding, riveting, brazing or with shakeproof threaded fasteners.

The illustrated test fixture 18 is dimensioned to test a relatively long device such as a structural component for an aircraft. A fixture for testing small components such as a printed circuit board may have a substantially cubical shape, each side being one foot in length for example, and having fittings 22 on its side plates as well as its top plate.

Figure 2:
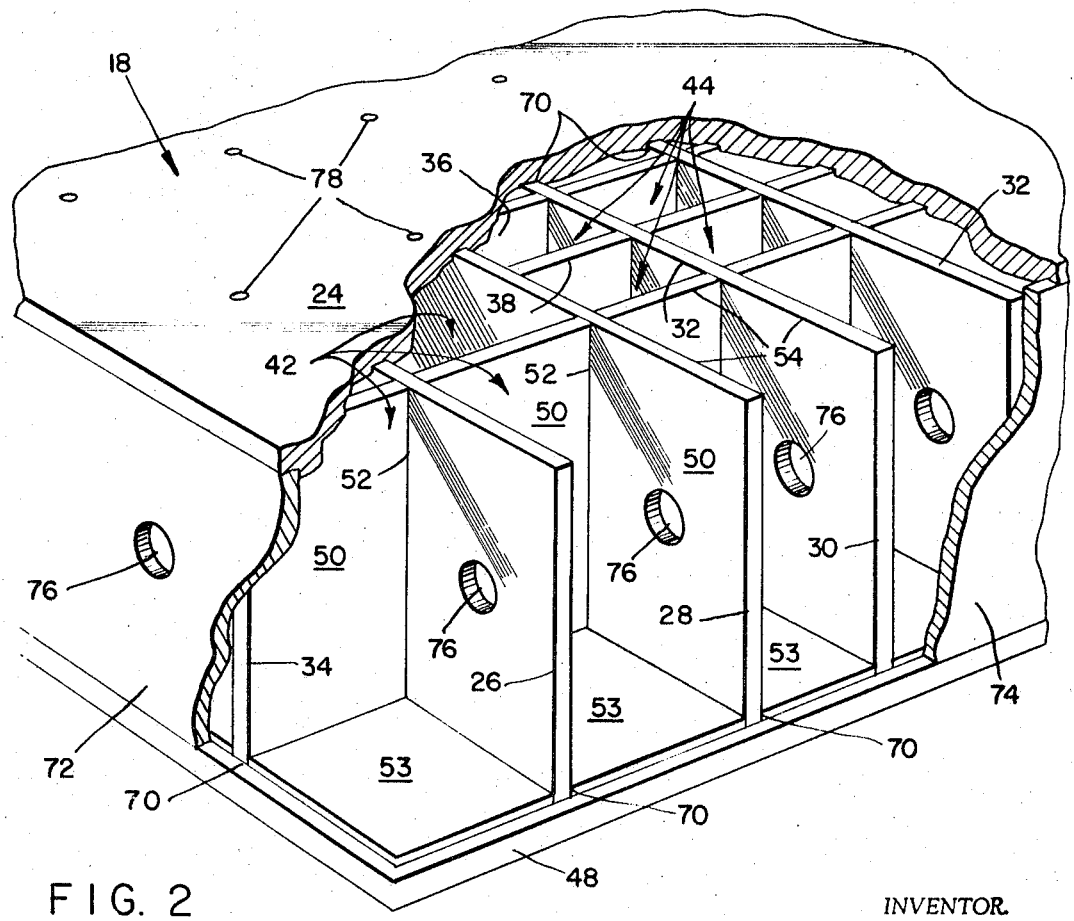
FIG. 2 is a perspective view, partly broken away, of a fragment of a test fixture embodying the invention and for use in the machine of FIG. 1.

Turning now to FIG. 2, the test fixture 18 is constructed with a plurality of thin metal plates 26, 28, 30, 32 and 34, 36, 38. The plates 26–32 are parallel to each other and extend at right angles to the plates 34–40 to form an ordered array of cells 42—42 and 44—44. The cells are sandwiched between the top plate 24 and a bottom plate 48.

The edges of the walls of each cell 42 or 44 are secured, by brazing, to the walls of its adjacent cells and to the top and bottom plates. Thus, the vertical edges 52 of the cell side walls 50 are brazed to the edges of the side walls adjacent cells. The lateral edges 54 of the cell side walls 50 are brazed to the cell end walls 53 formed by the top plate 24 and the bottom plate 48. Accordingly, all the edges of each cell wall are secured to a member extending transversely to the wall.

With this construction, the test fixture 18 deflects as an integral unit. The first or fundamental resonant frequency of this unit can be made quite high, depending on the size and strength requirements imposed on it. The individual cell walls resonate only at frequencies well above this fundamental unit resonance of the fixture. For example, in practice the individual cell walls generally have a fundamental resonance frequency above 2,000 cycles per second. Thus, test fixtures having brazed thin wall construction are essentially resonant free and have unity transmissibility, over broad frequency ranges that satisfy present-day test requirements.

By way of example, FIG. 4 shows three curves of transmissibility plotted as a function of the frequency of the actuator output force. Both scales in the graph are logarithmic. The transmissibility of a 15-pound fixture is plotted as a solid line in curve 60 without the load of a component 12 (FIG. 1), and as a broken line in curve 62 as loaded with a 13-pound component.

These curves show that both when loaded and unloaded, this fixture had a 1.0 transmissibility up to 2,000 cycles per second. In fact, the transmissibility of the unloaded fixture does not exceed 1.2 up to 5,000 cycles per second. With the 13-pound load, the resonance amplification factor is below 1.5 through the first four resonances and up to 5,000 cycles per second. With prior art test fixtures, resonance transmissibilities are often in excess of 10.

FIG. 4 also shows, in the dotted curve 64, the transmissibility of a much larger and heavier 230 pound test fixture embodying the present invention. The fixture transmissibility is 1.0 up to 100 cycles per second and does not exceed 1.1 up to 350 cycles per second, through the first two resonances.

By way of comparison, a welded structural aluminum test fixture for performing the same tests as the thin plate fixture whose transmissibility is ploted in curve 64 exhibited a resonance at 70 cycles per second at which its transmissibility increased to 10.

Referring again to FIG. 2, the test fixture 18 illustratively is six inches high, 22 inches wide and 46 inches long. The top and bottom plates 24 and 48 are of ½ inch thick aluminum and plates 26–38 are each of ¼ inch thick aluminum. These dimensions and the other quantitative values herein are presented for illustration only.

Figure 3:
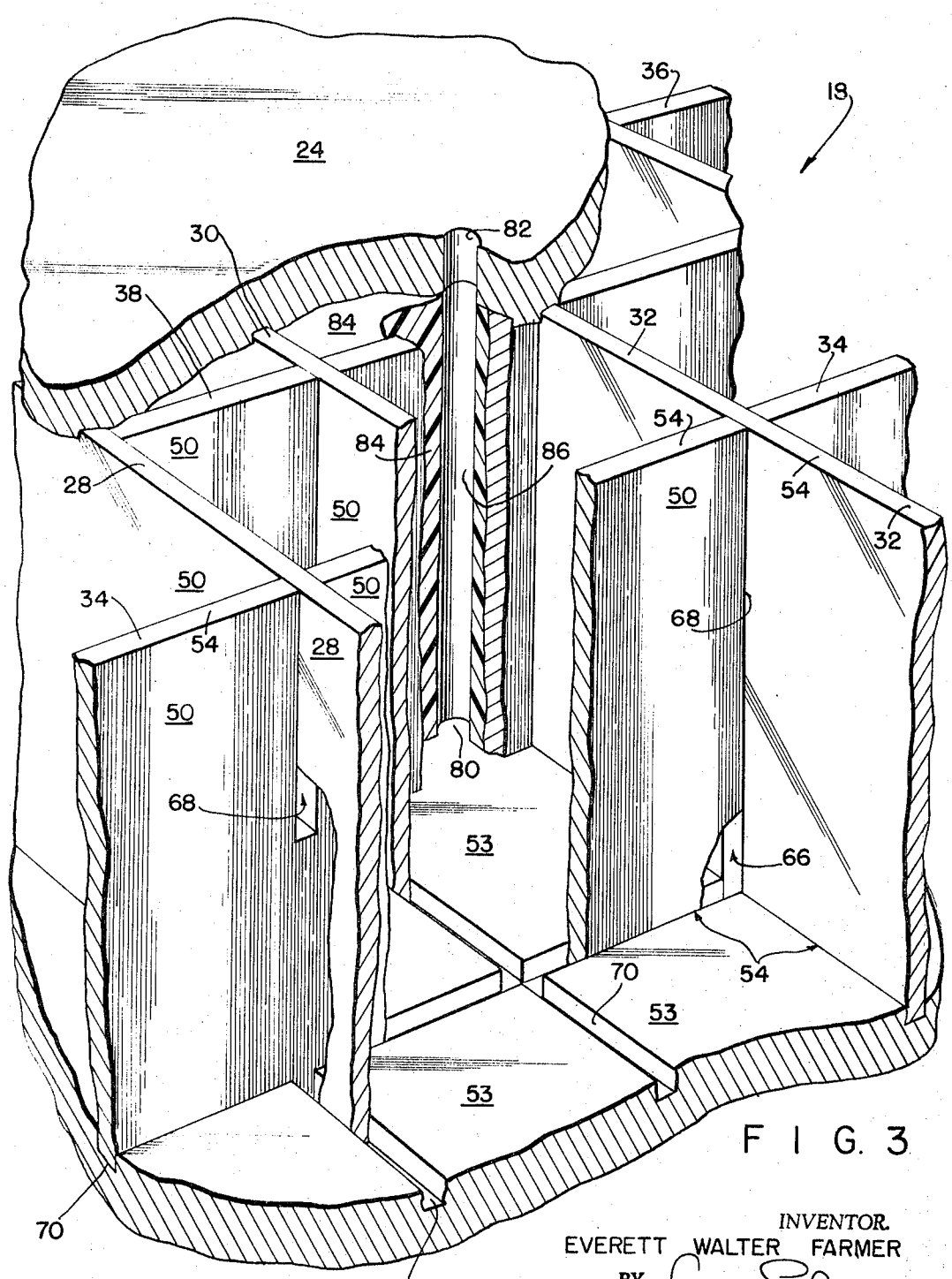
FIG. 3 is a perspective fragmentary view showing further details of the test fixture of FIG. 2.

The plates 26–38 are preferably formed in the same manner as the dividers in a conventional egg carton. That is, as shown in FIG. 3, the plate 34, typical of the other plates in the interior of the test fixture 18, has a number of wall sections, each of which forms one cell side wall 50. Where two intersecting plates meet, each plate has a single slot extending half-way along its height and mating with a corresponding slot in the other plate. Thus, where it intersects the plate 34, the plate 32 has a narrow slot 66 extending upward from its bottom lateral edge. Correspondingly, the plate 34 has a mating slot 68 extending downward from its upper lateral edge 54.

FIGS. 2 and 3 also show that the top and bottom fixture plates 24 and 48 are preferably provided with a plurality of slots 70 corresponding to the pattern of the interior plates, such as plates 26–28, as well as peripheral side wall plates, two of which are shown in FIG. 2 at 72 and 74.

With the bottom and top plates thus formed with a pattern of slots 70, the test fixture is appropriately fabricated by assembling the interior and side wall plates on the bottom plate 48. The top plate 24 is then fitted in place with the interior and side wall plates sandwiched between it and the bottom plate 48. The completely assembled test fixture is then brazed to form a unitary structure, preferably by dip brazing.

For admitting the braze flux material into the interior of the fixture and for venting air and other gases from the cells 42–44, the set of plates running in one direction, such as the set including the plates 26, 28, 30 and 32, is stamped or otherwise formed with holes 76, shown in FIG. 2. The holes 76 provide communication from every cell to the outside of the fixture. Also, it has been found preferable to provide a further vent hole from each cell through say, the top plate 24, at the cell corner that is highest when the fixture is immersed in the brazing tanks. Where desired, the holes 78 can be plugged after the brazing operations are complete. However, their presence does not detract materially from the dynamic characteristics of the completed fixture.

As noted above, the members for the illustrated fixture 18 are preferably of aluminum. The reason for this is that aluminum alloys can be made with a desirable balance between the modulus of elasticity and the internal hysteresis damping. The latter property is important in achieving the low amplification at resonances.

An alternative technique for holding together the members of the test fixture prior to and during the brazing operation is by spot welding. Although this avoids the requirement for the slots 66, 68 in the interior plates and the grooves 70 in the top and bottom plates of the fixture, the slotted construction has been found to be generally preferable. One advantage of it is that the size of the cells can be made as small as desired, since there is no need to provide access space for welding equipment.

As noted above, environmental test actuators such as the actuator 14 in FIG. 1 are conventionally provided with studs 20 (FIG. 1) for receiving the test fixture and securing it to the output member of the actuator. As shown in FIG. 3, the bottom plate 48 has a hole 80 for receiving each such stud. Access to this hole from the top of the fixture is provided through a clearance hole 82 in the top plate 24.

It is also often desirable that each cell receiving a mounting stud be filled with a rigid foam body 84. A clearance passage 86 is formed through the foam between the top plate clearance hole 82 and the bottom plate hole 80. The body 84 prevents loss of the threaded fastener assembled on the actuator stud during installation. The foam body 84 or equivalent fastener-channeling element is particularly desirable in heavy test fixtures where manipulating the fixture to retrieve a lost fastener would be difficult.

FIG. 2 also shows that the fixture 18 has cells of different sizes. More particularly, in the illustrated fixture the spacing between the side wall plates 28, 30 and 32 is less than the spacing between the plates 26, 28 and 72. Further, the plate 38 forms even smaller cells 44.

The reason for this readily becomes apparent when one considers that stresses of different values develop at different places within a fixture. For example, very high stress concentrations occur at the places where the test fixture is secured to the actuator. Having cells of different sizes enables these different stresses to be distributed roughly equally to the cell walls. Thus, the cells are made small where high stresses develop, and correspondingly, larger cells can be used where relatively small stresses occur. For example, test fixtures according to the invention have been constructed with the lengths of the cell side walls ranging from around 1½ inches to 2¾ inches. As a result, the plates of the fixture are all subjected to relatively uniform maximum stresses.

It will thus be seen that the present thin plate technique for designing test fixtures enables the fixture to be tailor-made for a given application according to the stress distributions that develop during use. This results in light weight and minimal material consumption. In addition to lessening the structural requirements of the actuator, the light weight of the fixture enhances the range of its resonant-free operation.

It will also be noted from examination of FIG. 3 that each of the holes 80 through which the test fixture is secured to the actuation is preferably located at the corner of a cell, or at least close to one wall of a cell rather than in the middle of the cell and wall.

In summary, the invention described above provides mechanical environmental test equipment wherein an actuator imparts test forces to a fixture that is rigid and resonant free over a remarkedly broad frequency range, and yet is relatively light weight. Moreover, the test fixture can be fabricated at considerably less expense than comparable prior art test fixtures.

The test fixture is constructed with intersecting thin plates sandwiched between top and bottom plates to form an ordered array of cells. The plates are secured together to form an integral structure that deflects as a unit by brazing, preferably dip brazing.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In mechanical environmental test apparatus having a mechanical force-producing actuator and a device-receiving test fixture secured to said actuator for subjecting a device mounted thereon to said actuator forces, the improvement wherein said test fixture comprises:
   A. a plurality of hollow cells having side walls formed by sheet members,
   B. top and bottom plates secured to said sheet members and forming the end walls of said cells,
   C. said side and end walls of each cell being continuously secured along their edges to other transversely extending cell walls,
   D. said side walls of different cells having different lengths according to the stresses developed in different paths of said fixture,
   E. said fixture being secured to said actuator by discrete, essentially point-loading, connections, said connections being made to said bottom plate at points removed from the centers of cell end walls.

2. Apparatus according to claim 1 wherein said connections between said fixture and said actuator are made to said bottom plate at points that are adjacent the corners of cell end walls.

3. A mechanical enviromental test fixture comprising in combination
   A. a plurality of laterally extending upstanding metal plates intersecting each other to form the side walls of an array of cells, said side walls of the different cells having different lengths according to the stresses developed in the different parts of said fixture with the cells form a lower stress area to a high stress area being progressively smaller,
      (1) each plate forming at least one cell side wall,
      (2) said plates being dip brazed together along the edges of every cell side wall, and
   B. top and bottom metal plates disposed, respectively, above and below said array of cells and forming the cell end walls,
      (1) said top and bottom plates being dip brazed to said side wall plates along the edges of every cell end wall.

4. A test fixture according to claim 3 wherein said side walls plates and said top and bottom plates are of aluminum.

5. A test fixture according to claim 3 wherein each cell is a rectangular parallelepiped.

6. A test fixture according to claim 3 wherein at least some of said side wall plates form at least two cell side walls, each such multiple-wall plate having a plate-receiving slot where it intersects with another multiple-wall plate so that intersecting multiple-wall plates fit together according to an egg-crate construction.

7. A test fixture according to claim 6 wherein at least one of said top and bottom plates has means forming grooves recessing the inner surface thereof, said grooves conforming to the pattern of said cells and receiving the lateral edges of said side wall plates.

8. A test fixture according to claim 7 wherein both said top and bottom plates have means forming side wall plate-receiving grooves.

9. A multiple-element fabricated mechanical environmental test fixture comprising in combination
   A. a plurality of laterally extending upstanding metal plates forming the side walls of an array of cells, said side walls of the different cells having different lengths according to the stresses in the different parts of said fixture with the cells from a lower stress area to a high stress area being progressively smaller,
      (1) each plate forming at least one cell side wall, (2) said plates being brazed together along the edges of every cell side wall, B. top and bottom metal plates secured to said side wall plates and forming end walls for said cells,
  (1) said top and bottom plates being brazed to said side wall plates along the edges of every cell end wall, and C. means forming at least a pair of holes through two different walls of each cell,
  (1) said holes forming a passage from the interior of each cell through an external surface of said fixture so that molten brazing material and gases can flow between the outside of said fixture and the interior of each cell.

10. A test fixture according to claim 9 wherein said holes are formed in the side wall plates forming opposing side walls of said cells.

11. A test fixture according to claim 9 wherein a selected one of said top and bottom plates has means forming a plurality of vent holes therethrough, there being at least one vent hole through each cell end wall which said selected plate forms, and said vent holes communicating with correspondingly-positioned corners of each end wall.

12. A multiple element fabricated mechanical environmental test fixture comprising in combination A. a plurality of laterally extending upstanding metal plates forming the side walls of an array of cells, said side walls of the different cells having different lengths according to the stresses developed in the different parts of said fixture with the cells from a lower stress area to a high stress area being progressively smaller, B. top and bottom metal plates being secured, respectively, above and below said array of cells and forming end walls of said cells,
  (1) said side wall plates and said top and bottom plates being brazed together along all the edges of every cell wall, C. means forming at least one mounting hole through said bottom plate, and D. means forming at least one access hole through said top plate, said mounting and access holes passing through the end walls of the same cell and being substantially aligned with each other.

13. A fixture according to claim 12 wherein said mounting hole passes through said bottom plate at a location removed from the center of the cell end wall.

14. A test fixture according to claim 12 wherein said mounting hole passes through said bottom plate adjacent a corner of the cell end wall.

15. A test fixture according to claim 12 further comprising guide means forming a passage communicating between the aligned mounting and access holes, said guide means constraining objects from passing from said passageway into the remaining interior of the cell.

16. A test fixture according to claim 12 further comprising a substantially rigid foam substantially filling the interior of the cell in which said mounting and access holes are formed, said foam having a passageway formed therein communicating between said access and mounting holes.

17. A multiple element fabricated mechanical environmental test fixture comprising in combination A. a first set of parallel laterally extending upstanding aluminum plates, B. a second set of parallel upstanding aluminum plates laterally extending transverse to and intersecting the plates of said first set thereof to form with said first set of plates the side walls of a single-layer array of cells,
  (1) said plates of said first and second sets being brazed together along substantially the entire length of the edges of every cell side wall, and
  (2) some of said cells having different side wall lengths according to the stresses developed within said test fixture under the influence of external forces applied thereto, C. an aluminum bottom plate extending over the entire area of said array of cells,
  (1) said bottom plate having an interior surface recessed with a pattern of grooves corresponding to the pattern of said first and second sets of plates,
  (2) said bottom plate receiving all the bottom lateral edges of each of said cells in said grooves and forming the bottom end walls of said cells,
  (3) said bottom plate being brazed to said side plates along substantially the entire length of all the edges of said cell bottom end walls, D. means forming at least three mounting holes through said bottom plate,
  (1) each mounting hole passing through said bottom plate at a point removed from the center of a cell bottom wall, and E. an aluminum top plate extending over the entire area of said array of cells,
  (1) said top plate having an interior surface recessed with a pattern of grooves corresponding to the pattern of said first and second sets of plates,
  (2) said top plate receiving all the top lateral edges of each of said cells in said grooves and forming the top end walls of said cells,
  (3) said top plate being brazed to said side plates along substantially the entire length of all the edges of said cell top end walls, and
  (4) said top plate having means forming an access hole aligned above each of said mounting holes, each access hole communicating with the same cell as its correspondingly-aligned mounting hole.

18. A test fixture according to claim 17 wherein each of said side wall plates that forms more than one cell side wall has means forming a plate-receiving slot extending along its intersection with another side wall plate that extends on both sides of the former plate so that intersecting plates extending beyond the intersection have engaging slots that interfit.

19. A test fixture according to claim 17 wherein each cell has means forming an aperture through each of its constituent plates of said first set thereof.

References Cited

UNITED STATES PATENTS

| | | | |
|---|---|---|---|
| 2,412,860 | 12/1946 | Baudry et al. | 73—71.6 X |
| 2,438,756 | 3/1948 | Larsen | 73—71.6 X |
| 2,599,036 | 6/1952 | Efromson et al. | 73—71.6 X |
| 2,700,632 | 1/1955 | Ackerlind | 29—455 |
| 2,744,042 | 5/1956 | Pace | 29—455 |
| 2,960,197 | 11/1960 | Langhans | 29—455 |
| 3,016,578 | 1/1962 | Rohe | 29—455 |
| 3,036,672 | 5/1962 | Kohl | 29—455 |
| 3,061,912 | 11/1962 | Kalil | 29—455 |
| 3,123,907 | 3/1964 | Thomas | 29—455 |
| 3,170,428 | 2/1965 | Herman et al. | 29—455 |
| 3,078,002 | 2/1963 | Rodgers. | |
| 3,106,015 | 10/1963 | Herbert | 29—455 XR |

OTHER REFERENCES

An article by F. F. Rechlin entitled "6 Basic Design Suggestions for Brazed Honeycomb Sandwich," from Product Engineering, Mid-September 1959, pages 375–377, page 376. (Copy in group 320.)

JAMES J. GILL, *Primary Examiner.*